United States Patent
Luke et al.

(10) Patent No.: US 7,219,733 B2
(45) Date of Patent: May 22, 2007

(54) ZEOLITE COMPOSITIONS FOR LOWERING MAXIMUM CEMENTING TEMPERATURE

(75) Inventors: Karen Luke, Duncan, OK (US); Russell M. Fitzgerald, Velma, OK (US); Frank Zamora, San Antonio, TX (US); Joe M. Sandy, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 238 days.

(21) Appl. No.: 10/954,116

(22) Filed: Sep. 29, 2004

(65) Prior Publication Data

US 2006/0065399 A1 Mar. 30, 2006

(51) Int. Cl.
- *E21B 36/00* (2006.01)
- *E21B 33/13* (2006.01)
- *E21B 33/14* (2006.01)
- *C08B 22/06* (2006.01)

(52) U.S. Cl. ............ 166/293; 166/292; 166/309; 166/901; 106/677; 106/679; 106/695; 106/809; 106/813; 106/818; 106/DIG. 1

(58) Field of Classification Search .......... 166/292, 166/293, 309, 901; 106/672, 677, 679, 695, 106/809, 813, 818, DIG. 1
See application file for complete search history.

(56) References Cited

U.S. PATENT DOCUMENTS

| | | |
|---|---|---|
| 2,094,316 A | 9/1937 | Cross |
| 2,131,338 A | 9/1938 | Vail |
| 2,349,049 A | 5/1944 | Means ............ 252/8.5 |
| 2,727,001 A | 12/1955 | Rowe |
| 2,848,051 A | 8/1958 | Williams |
| 3,047,493 A | 7/1962 | Rosenberg |
| 3,065,170 A | 11/1962 | Dumbauld et al. |
| 3,179,528 A * | 4/1965 | Holmgren et al. ........ 106/649 |
| 3,293,040 A | 12/1966 | Shaler, Jr. et al. |
| 3,694,152 A | 9/1972 | Sersale et al. ............ 423/329 |
| 3,781,225 A | 12/1973 | Schwartz |
| 3,884,302 A | 5/1975 | Messenger |
| 3,887,385 A | 6/1975 | Quist et al. ............ 106/96 |
| 3,888,998 A | 6/1975 | Sampson et al. |
| 3,963,508 A | 6/1976 | Masaryk |
| 4,054,462 A | 10/1977 | Stude |
| 4,311,607 A | 1/1982 | Kaeser |
| 4,363,736 A | 12/1982 | Block |
| 4,368,134 A | 1/1983 | Kaeser |

(Continued)

FOREIGN PATENT DOCUMENTS

CA 2153372 7/1995

(Continued)

OTHER PUBLICATIONS

SPE 20624 entitled "Acidization of Analcime-Cementing Sandstone, Gulf of Mexico", by D.R. Underdown et al., dated 1990.

(Continued)

*Primary Examiner*—George Suchfield
(74) *Attorney, Agent, or Firm*—Craig W. Roddy; Haynes and Boone, LLP

(57) ABSTRACT

Zeolite compositions having a low maximum setting temperature for use in permafrost and waterwell applications are provided.

20 Claims, 2 Drawing Sheets

U.S. PATENT DOCUMENTS

| | | | |
|---|---|---|---|
| 4,372,876 A | 2/1983 | Kulprathipanja et al. | |
| 4,435,216 A | 3/1984 | Diehl et al. | 106/97 |
| 4,468,334 A | 8/1984 | Cox et al. | |
| 4,474,667 A | 10/1984 | Block | |
| 4,548,734 A | 10/1985 | Chaux et al. | |
| 4,552,591 A | 11/1985 | Millar | |
| 4,632,186 A | 12/1986 | Boncan et al. | |
| 4,650,593 A | 3/1987 | Singerland | |
| 4,772,307 A | 9/1988 | Kiss et al. | |
| 4,784,693 A | 11/1988 | Kirkland et al. | |
| 4,888,120 A | 12/1989 | Mueller et al. | |
| 4,943,544 A | 7/1990 | McGarry et al. | 501/124 |
| 4,986,989 A | 1/1991 | Sirosita et al. | |
| 5,346,012 A | 9/1994 | Heathman et al. | 166/293 |
| 5,383,967 A | 1/1995 | Chase | 106/737 |
| 5,435,846 A | 7/1995 | Tatematsu et al. | 106/813 |
| 5,494,513 A | 2/1996 | Fu et al. | 106/672 |
| 5,527,387 A | 6/1996 | Andersen et al. | 106/693 |
| 5,529,624 A | 6/1996 | Riegler | 106/675 |
| 5,588,489 A | 12/1996 | Chatterji et al. | |
| 5,626,665 A | 5/1997 | Barger et al. | 106/706 |
| 5,658,624 A | 8/1997 | Anderson et al. | 428/34.7 |
| 5,711,383 A | 1/1998 | Terry et al. | |
| 5,788,762 A | 8/1998 | Barger et al. | 106/706 |
| 5,807,810 A | 9/1998 | Blezard et al. | |
| 6,138,759 A | 10/2000 | Chatterji et al. | |
| 6,145,591 A | 11/2000 | Boncan et al. | 166/291 |
| 6,149,724 A | 11/2000 | Ulibarri et al. | |
| 6,170,575 B1 | 1/2001 | Reddy et al. | 166/293 |
| 6,182,758 B1 | 2/2001 | Vijn | |
| 6,209,646 B1 | 4/2001 | Reddy et al. | |
| 6,230,804 B1 | 5/2001 | Mueller | 166/293 |
| 6,245,142 B1 | 6/2001 | Reddy et al. | 106/724 |
| 6,372,694 B1 | 4/2002 | Osinga et al. | |
| 6,379,456 B1 | 4/2002 | Heathman et al. | 106/724 |
| 6,390,197 B1 | 5/2002 | Maroy | |
| 6,409,819 B1 | 6/2002 | Ko | 106/707 |
| 6,457,524 B1 | 10/2002 | Roddy | 166/293 |
| 6,478,869 B2 | 11/2002 | Reddy et al. | 106/724 |
| 6,494,951 B1 | 12/2002 | Reddy et al. | 106/705 |
| 6,565,647 B1 | 5/2003 | Day et al. | 106/813 |
| 6,572,698 B1 | 6/2003 | Ko | 106/772 |
| 6,610,139 B2 | 8/2003 | Reddy et al. | 106/724 |
| 6,626,243 B1 | 9/2003 | Boncan | 166/293 |
| 6,645,289 B2 | 11/2003 | Sobolev et al. | 106/705 |
| 6,660,080 B2 | 12/2003 | Reddy et al. | 106/724 |
| 6,722,434 B2 | 4/2004 | Reddy et al. | |
| 6,767,868 B2 | 7/2004 | Dawson et al. | |
| 6,786,966 B1 | 9/2004 | Johnson et al. | |
| 6,832,652 B1 | 12/2004 | Dillenbeck et al. | |
| 6,840,319 B1 | 1/2005 | Chatterji et al. | |
| 6,889,767 B2 | 5/2005 | Reddy et al. | |
| 7,137,448 B2 | 11/2006 | Arias et al. | 466/292 |
| 2002/0091177 A1 | 7/2002 | Gonnon et al. | 524/5 |
| 2002/0117090 A1 | 8/2002 | Ku | 106/737 |
| 2003/0153466 A1 | 8/2003 | Allen et al. | 504/358 |
| 2003/0203996 A1 | 10/2003 | Gonnon et al. | 524/5 |
| 2004/0040475 A1 | 3/2004 | Roij | 106/819 |
| 2004/0107877 A1 | 6/2004 | Getzlaf et al. | 106/813 |
| 2004/0108113 A1 | 6/2004 | Luke et al. | 166/292 |
| 2004/0112600 A1* | 6/2004 | Luke et al. | 166/295 |
| 2004/0187740 A1 | 9/2004 | Timmons | |
| 2004/0188091 A1 | 9/2004 | Luke et al. | 166/291 |
| 2004/0188092 A1 | 9/2004 | Santra et al. | 166/291 |
| 2004/0244977 A1 | 12/2004 | Luke et al. | 166/292 |
| 2004/0262000 A1 | 12/2004 | Morgan et al. | |
| 2004/0262001 A1 | 12/2004 | Caveny et al. | |
| 2005/0000734 A1 | 1/2005 | Getzlaf et al. | 175/73 |
| 2005/0034864 A1 | 2/2005 | Caveny et al. | |
| 2005/0133222 A1 | 6/2005 | Arias et al. | |
| 2006/0025312 A1* | 2/2006 | Santra et al. | 507/269 |

FOREIGN PATENT DOCUMENTS

| | | |
|---|---|---|
| EP | 0 802 253 A1 | 10/1997 |
| EP | 0 895 971 A1 | 2/1999 |
| EP | 1 260 491 A1 | 11/2002 |
| EP | 1 428 805 A1 | 6/2004 |
| GB | 1469954 | 4/1977 |
| GB | 2 353 523 A | 2/2001 |
| JP | 61021947 A | 1/1986 |
| JP | 07 003254 | 1/1995 |
| WO | WO 98/54108 | 12/1998 |
| WO | WO 01/70646 A1 | 9/2001 |
| WO | WO 2005/059301 | 6/2005 |

OTHER PUBLICATIONS

SPE 39595 entitled "Designing a Remedial Acid Treatment for Gulf of Mexico Deepwater Turbidite Sands Containing Zeolite Cement", by B.A. Rogers et al., dated 1998.

Paper entitled "Tectonis, fluid migration, and fluid pressure in a Deformed forearc basin, Cook Inlet, Alaska", by R.L. Bruhn et al., pp. 550-563, dated 2000.

Paper entitled "Hydraulic Conductivity Measurement On Discrete Samples Collected From Leg 141, Site 863", by Kevin Brown, pp. 401-405, dated 1995.

Paper entitled "Alteration of Clay Minerals And Zeolites In Hydrothermal Brines", by Sridhar Komarneni et al., pp. 383-391, dated 1983.

Paper entitled "A Non-Conventional Way of Developing Cement Slurry For Geothermal Wells", by V. Barlet-Gouedard et al., pp. 85-91, dated 2001.

Paper entitled "Portland-Zeolite-Cement For Minimizing Alkali-Aggregate Expansion", by R. Sersale, pp. 404-410, dated 1987.

Paper entitled "Zeolite Crystallization In Portland Cement Concrete Due To Alkali-Aggregate Reaction", by S.A. Marfil et al., paged 1283-1288, dated 1993.

Paper entitled "A study on the hydration rate of natural zeolite blended Cement pastes", by C.S. Poon et al., pp. 427-432, dated 1999.

Paper entitled "Zeolite ceramsite cellular concrete", by N-Q. Feng pp. 117-122, dated 2000.

Paper entitled "Immobilization of caesium-loaded ion exchange resins in Zeolite-cement blends", by Sandor Bagosi et al., pp. 479-485, dated 1999.

Paper entitled "Effect of Bentonite and Zeolite on Durability of Cement Suspension under Sulfate Attack", by Ivan Janotka, pp. 710-715, dated 1988.

Paper entitled "Reuse of waste catalysts from petrochemical industries For cement substitution", by Nan Su et al., pp. 1773-1783, dated 2000.

Paper entitled "Extreme vertices design of concrete with combined Mineral admixtures", by Jian-Tong Ding et al., pp. 957-960, dated 1999.

Paper entitled "The Properties of Mortar Using Blends With Portland Cement Clinker, Zeolite Tuff and Gypsum", by Ivan Janotka, et al., pp. 105-110, dated 1995.

Paper entitled "Study on the suppression effect of natural zeolite on Expansion of concrete due to alkali-aggregate reaction", by Feng Naiqian et al., pp. 17-24, dated 1998.

Paper entitled "Comparative study of the initial surface absorption and Chloride diffusion of high performance zeolite, silica fume and PFA Concrete", by Sammy Y.N. Chan et al., pp. 293-300, dated 1999.

Paper entitled "A study on the hydration rate of natural zeolite Blended cement pastes", by C.S. Poon et al., pp. 427-432, dated 1999.

Japan Abstract No. J52117316 dated Oct. 1, 1977.

Japan abstract No. J10110487 dated Apr. 28, 1998.

Abstract No. SU1373781 dated Feb. 15, 1988.

Paper entitled "Zeolite P In Cements" Its Potential For Immobilizing. Toxic And Radioactive Waste Species by M. Atkins et al., dated 1994.

Powder Diffraction File, PFD, Alphabetical Indexes for Experimental Patterns, Inorganic Phases, Sets 1-52, dated 2002.

Portland Cement Association, "Portland Cement, Concrete, and Heat of hydration", Concrete Technology Today, (1997), pp. 1-4, vol. 18, No. 2, Construction Information Services Department of the Portland Cement Association.

International Center for Materials Technology Promotion, "Special Cements and Their Production Technology: CSA Series, Hydraulic Cement Series, Oil Well Cement Series etc: Hydraulic Engineering Cement", (2003).

Application entitled "Zeolite-Cotaining Drilling Fluids" by Donald A. Getzlaf et al., U.S. Appl. No. 10/795,158, filed Mar. 5, 2004.

Application entitled "Fluid Loss Additives for Cement Slurries" by Karen Luke et al., U.S. Appl. No. 10/816,034, filed Apr. 1, 2004.

Application entitled "Zeolite-Containing Remedial Compositions" by Karen Luke et al., U.S. Appl. No. 10/727,370, filed Dec. 4, 2003.

Foreign communication from a related counterpart application dated Feb. 3, 2006.

Luke, Karen et al., "Zeolite-Containing Drilling Fluids," filed Oct. 9, 2006 as U.S. Appl. No. 11/544,691.

Luke, Karen et al., "Fluid Loss Additives for Cement Slurries," filed Oct. 10, 2006 as U.S. Appl. No. 11/545,392.

Fyten, Glen et al., "Cementitious Compositions Containing Interground Cement Clinker and Zeolite" filed Nov. 8, 2006 as U.S. Appl. No. 11/594,435.

Fyten, Glen et al., "Cementitious Compositions Containing Interground Cement Clinker and Zeolite" filed Nov. 8, 2006 as U.S. Appl. No. 11/594,326.

Fyten, Glen et al., "Cementitious Compositions Containing Interground Cement Clinker and Zeolite" filed Nov. 8, 2006 as U.S. Appl. No. 11/594,430.

* cited by examiner

ZEOLITE COMPOSITIONS FOR LOWERING MAXIMUM CEMENTING TEMPERATURE

BACKGROUND

Conventionally, a wellbore is drilled using a drilling fluid that is continuously circulated down a drill pipe, through a drill bit, and upwardly through the wellbore to the surface. The next operation usually involves running a pipe string, e.g., casing, into the wellbore, and then cleaning out the wellbore, after which primary cementing operations are typically performed. The pipe is cemented in the wellbore by placing a cement slurry in the annulus between the pipe and the walls of the wellbore. The cement slurry sets into a hard impermeable mass, and is intended to bond the pipe to the walls of the wellbore whereby the annulus is sealed and fluid communication between subterranean zones or to the surface by way of the annulus is prevented.

During any of the above or other operations performed in the wellbore, a number of problems can occur, some of which are caused by the increased temperature achieved by the setting of the cement slurry, particularly in applications involving a permafrost environment or in a waterwell environment. The heat of hydration of cement is the heat generated when water (or a carrier fluid) and portland cement react. Hydration of the tricalcium silicate and tricalcium aluminate components, particularly the tricalcium aluminate, of portland cements produces an exothermic reaction that generates heat. In most cement structures, the resulting temperature increase is small because the heat is dissipated rapidly from exposed surfaces. However, in permafrost applications, dissipated heat from the setting of cement can cause damage to the surrounding environment by softening or melting the permafrost. Further, in waterwell applications where PVC pipe is used for casing, the dissipated heat can damage the pipe by softening or melting the PVC.

DESCRIPTION

Figure 1:
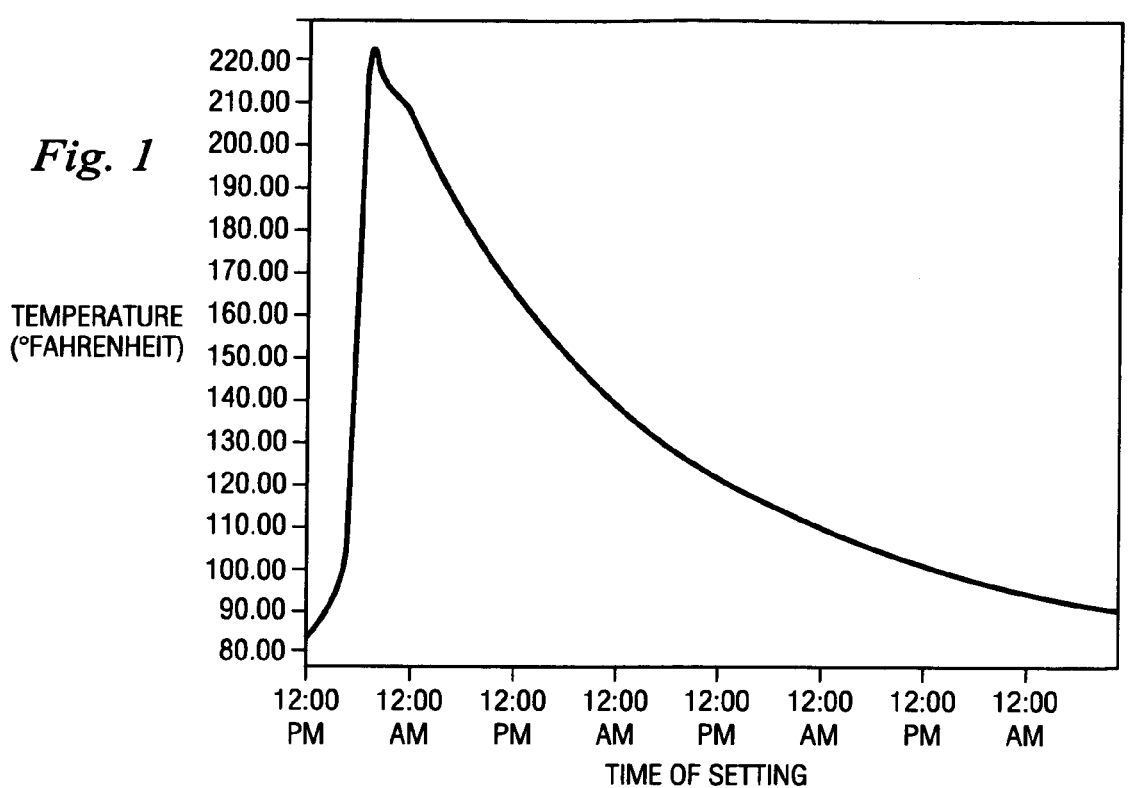
FIG. 1 is a plot of temperature vs. time of setting for cement composition 1.

The present embodiments relate to cementitious compositions containing zeolite that are designed for low maximum temperature of setting for applications that benefit from such low temperature setting such as in permafrost applications and in waterwell applications. In addition, the compositions of the present embodiments include zeolite and have higher compressive strength as compared to cementitious compositions that do not include zeolite. In particular, compositions of the present embodiments that include cement and zeolite demonstrate a reduction of 25° F. (13.9° C.) in the maximum temperature reached during setting compared to a cement composition that does not include zeolite. Further, compositions of the present embodiments that include zeolite and fly ash demonstrate a reduction of 41.4° F. (23° C.) in the maximum temperature reached during setting compared to a composition of fly ash that does not include zeolite. For the compositions of the present embodiments that contain zeolite and cement, and zeolite and fly ash, the compressive strength for a 72 hour set time was increased 55% and 354%, respectively as compared to compositions of cement and fly ash, respectively, that do not include zeolite.

A method of performing a cementing operation in a permafrost zone or a waterwell zone, the zone penetrated by a wellbore, is an embodiment of the present invention. The method comprises placing a cementitious composition into the zone, the cementitious composition comprising a base mix of cementitious material and zeolite, and a carrier fluid; and allowing the cementitious composition to set therein. The cementing operation may be primary or remedial cementing.

Zeolites: Zeolites are porous alumino-silicate minerals that may be either a natural or manmade material. Manmade zeolites are based on the same type of structural cell as natural zeolites, and are composed of aluminosilicate hydrates having the same basic formula as given below. It is understood that as used in this application, the term "zeolite" means and encompasses all natural and manmade forms of zeolites. All zeolites are composed of a three-dimensional framework of $SiO_4$ and $AlO_4$ in a tetrahedron, which creates a very high surface area. Cations and water molecules are entrained into the framework. Thus, all zeolites may be represented by the crystallographic unit cell formula:

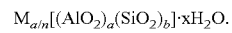

$$M_{a/n}[(AlO_2)_a(SiO_2)_b] \cdot xH_2O.$$

M represents one or more cations such as Na, K, Mg, Ca, Sr, Li or Ba for natural zeolites and $NH_4$, $CH_3NH_3$, $(CH_3)_3NH$, $(CH_3)_4N$, Ga, Ge and P for manmade zeolites; n represents the cation valence; the ratio of b:a is in a range from greater than or equal to 1 and less than or equal to 5; and x represents the moles of water entrained into the zeolite framework.

Zeolites for use in the compositions of the present embodiments include analcime (hydrated sodium aluminum silicate), bikitaite (lithium aluminum silicate), brewsterite (hydrated strontium barium calcium aluminum silicate), chabazite (hydrated calcium aluminum silicate), clinoptilolite (hydrated sodium aluminum silicate), faujasite (hydrated sodium potassium calcium magnesium aluminum silicate), harmotome (hydrated barium aluminum silicate), heulandite (hydrated sodium calcium aluminum silicate), laumontite (hydrated calcium aluminum silicate), mesolite (hydrated sodium calcium aluminum silicate), natrolite (hydrated sodium aluminum silicate), paulingite (hydrated potassium sodium calcium barium aluminum silicate), phillipsite (hydrated potassium sodium calcium aluminum silicate), scolecite (hydrated calcium aluminum silicate), stellerite (hydrated calcium aluminum silicate), stilbite (hydrated sodium calcium aluminum silicate) or thomsonite (hydrated sodium calcium aluminum silicate), or combinations thereof. In certain embodiments of the invention, the zeolites for use herein include chabazite, clinoptilolite, or a combination thereof.

For the cementitious compositions of the present embodiments, zeolite is a component of a base mix. The amount of zeolite in the base mix is between 0% and 100% by weight. In additional embodiments of the cementitious compositions, zeolite is present in an amount ranging between any of and including any of 5%, 10%, 15%, 20%, 25%, 30%, 40%, 50%, 60%, 70%, 80%, 90%, or 95% by weight of base mix.

Cementitious material: The term "cementitious," as used herein, means having the properties of cement. The cementitious material comprises cement, fly ash, slag, diatomaceous earth, fumed silica, calcined shale, metakaolin, rice husk ash, or a combination thereof. A cementitious material of the present invention is a component of the base mix. The amount of cementitious material in the base mix is between 0% and 100% by weight and, in additional embodiments, the cementitious material is present in an amount ranging between any of and including any of 5%, 10%, 15%, 20%, 25%, 30%, 40%, 50%, 60%, 70%, 80%, 90%, or 95% by weight of base mix.

A variety of cements can be used with the present embodiments, including but not limited to hydraulic cements. Hydraulic cements set and harden by reaction with water and include Portland cements such as oil well cements, for example, pozzolan cements, gypsum cements, aluminous cements, silica cements, and alkaline cements. The physical properties of cement are a direct result of the chemical composition of cement, which composition includes tricalcium silicate, dicalcium silicate, tricalcium aluminate, tetracalcium aluminoferrite, and gypsum. By adjusting the amounts of each component the physical properties of cement are adjusted because of differences in the time and rate of hydration of each of the components.

Oil well cements are generally classified as follows:

API Class A cement is used in general as an ordinary grade of cement when no particular properties are required. Class A cement is used to depths of up to 6000 feet (1830 meters).

API Class B cement is also used to depths of up to 6000 feet (1830 meters) and has a moderate resistance to sulfates.

API Class C cement is used to depths of up to 6000 feet (1830 meters) and is a high initial resistance cement.

API Class G cement is a base cement used to depths of up to 8000 feet (2440 meters), and is used with accelerators or retarders for different depths and temperatures.

API Class H cement is similar to Class G cement, however, with a higher mixture density.

API Class B, C, G, and H cements can be obtained in grades that have high sulfate resistance. Typically in permafrost areas, API Class A, G, or H cements are used.

Further cements useful for embodiments of the present invention include ASTM Portland cements such as:

Type I Portland cement is a general purpose cement useful for most purposes.

Type II Portland cement is used where sulfate concentrations in groundwaters are higher than normal. Type II Portland cement will usually generate less heat at a slower rate than Type I Portland cement.

Type III Portland cement provides high strength at an early set time. It has more tricalcium silicate than Type I Portland cement. It is used when the structure must be ready for use quickly.

Type IA, IIA, and IIIA Portland cements are types of air-entraining Portland cements. They are the same as Types I, II, and III Portland cements, respectively, with the addition of small quantities of air-entraining materials interground with clinker to produce discrete air bubbles. These cements have improved resistance to freezing and thawing damage.

Type IV Portland cement is used where the rate and amount of heat generated during setting must be minimized such as for use in massive concrete structures. Type IV Portland cement contains about one half of the tricalcium silicate and tricalcium aluminate and twice the amount of dicalcium silicate as Type I Portland cement.

Type V Portland cement is a sulfate-resistant cement used where soil or groundwater has a high sulfate content. Type V Portland cement has a low tricalcium aluminate content.

Typically in permafrost areas, Type I, III, or V Portland cements are used.

API class C cement is similar to ASTM Type III Portland cement, however API does not allow grinding aids to be added to the cement during the grinding process whereas ASTM type cements have grinding aids added.

In general, since API Class C and ASTM Type III Portland cements are made specifically to generate early strength, they also generate a high heat of hydration and would not typically be selected for the present embodiments. However, cementing conditions may dictate a need for an early strength cement that would set at a lower temperature and, under such conditions, the cited types of cements may be selected for uses herein.

The fly ash included in embodiments of the present invention may be any commercially available fly ash. Fly ash is produced by the combustion of powdered coal with a forced draft. The fly ash is carried by flue gases and is recovered, for example, by electrostatic precipitators. Class C fly ash is commercially available from Halliburton Energy Services, Duncan, Okla. Class F fly ash is commercially available from Halliburton Energy Services as Pozmix® A or from Ashcor Technologies Limited (Calgary, Alberta, Canada). For compositions of the present embodiments, fly ash is present in the base mix in an amount between 0% and 100% by weight. In additional embodiments of the cementitious compositions, fly ash is present in an amount ranging between any of and including any of 5%, 10%, 15%, 20%, 25%, 30%, 40%, 50%, 60%, 70%, 80%, 90%, or 95% by weight of base mix.

Slag is commercially available from Lonestar Industries Inc. (Indianapolis, Ind., USA). Fumed silica is commercially available from Fritz Industries (Mesquite, Tex., USA) and Elkem Group (Oslo, Norway). Diatomaceous earth is commercially available from Western Pozzolan Corp. (Doyle, Nev., USA), calcined shale is commercially available from TXI (Houston, Tex., USA), metakaolin is commercially available from ISG Resources (South Jordan, Utah, USA) and Advanced Cement Technologies, LLC. (Blaine, Wash., USA), and rice husk ash is commercially available from Hi Rise Exports Private Ltd. (Calcutta, India) and Kittiya (U-Thaimai, Utaitanee, Thailand).

Source of Calcium Ion for Class F Fly Ash and Certain Cementitious Materials: Compositions of the present embodiments that include Class F fly ash and other pozzolanic cementitious materials such as diatomaceous earth, fumed silica, calcined shale, metakaolin, and rice husk ash also include a source of calcium ion. For compositions of the present embodiments that include added calcium, calcium ion is present in an amount of from about 5% to about 50% by weight of Class F fly ash or pozzolan and, in certain embodiments, calcium is present in an amount ranging between any of and including any of 10%, 15%, 20%, 25%, 30%, 35%, 40% or 45% by weight of Class F fly ash or pozzolan. A source of calcium may be an activator, or a calcium salt such as a salt having an anion containing a Group 4A, Group 5A, Group 6A, or Group 7A element, or a combination thereof, of the Periodic Table of the Elements. That is, carbonates, carboxylates, silicates, nitrates, nitrites, phosphates, sulfates, sulfites, and halide salts of calcium in addition to oxides and hydroxides of calcium provide a source of calcium, for example.

Optional Additives: Additives known to those of ordinary skill in the art may be included in the cementitious compositions of the present embodiments. Additives are typically blended with a base mix or may be added to a cementitious slurry. An additive may comprise an accelerator, a retarder, an activator, a defoamer, silica, a fluid loss control additive, a flow enhancing agent, a dispersant, or a combination thereof, for example. Selection of the type and amount of additive largely depends on the nature and composition of the set composition, and those of ordinary skill in the art will understand how to select a suitable type and amount of additive for compositions herein.

An activator is a catalyst for the setting reaction and may be one or more of lime, lime hydrate, calcium hydroxide, calcium chloride, sodium silicate, sodium fluoride, sodium silicofluoride, magnesium silicofluoride, zinc silicofluoride, sodium carbonate, potassium carbonate, sodium hydroxide, potassium hydroxide, sodium sulfate, or hydrates thereof, for example.

Setting accelerators increase the rate of the setting reaction and may be added to the cementitious compositions. Setting accelerators include compounds such as sodium chloride, sodium sulfate, sodium aluminate, sodium carbonate, calcium sulfate, calcium carbonate, aluminum sulfate, potassium sulfate, potassium carbonate and alums, or a combination thereof, for example.

A retarder slows the setting time of a cementitious composition, thereby allowing for control of the setting time of such a composition. Controlling the setting time is desirable to allow flexibility to adjust to wellbore conditions, or to adjust for adequate removal of drilling or spacer fluids. Retarders include a lignosulfonate, an organic acid having an α-hydroxy group such as citric acid, tartaric acid or gluconic acid, salts thereof, or a combination thereof, for example. Further examples of carboxylic acids that retard the setting time include carboxylic acids such as malic acid, lactic acid, combinations thereof, as well as alkaline earth metal salts thereof such as calcium, potassium, or barium salts, and the like. The salt of the organic acid may have a cation containing an element from Group 1A or Group 2A of the Periodic Table of the Elements.

Defoamers include agents such as polypropylene glycol, polypropylene glycol on diatomaceous earth, or a mixture of polypropylene glycol, olefin oil and hydrophobically modified silica.

Dispersants include agents such as salts of sulfonated naphthalene-formaldehyde condensate, salts of sulfonated naphthalene-formaldehyde condensate combined with polyvinylpyrolidone, salts of sulfonated melamine-formaldehyde condensates, salts of polyether polycarboxylate, sulfonic acid esters, carbohydrate esters or modified lignosulfonates, for example. The salt may have a cation containing an element from Group 1A or Group 2A of the Periodic Table of the Elements, and in certain embodiments the salt is a calcium or a sodium salt, or a combination thereof.

Carrier Fluids: Carrier fluids suitable for use in the compositions of the present embodiments comprise aqueous fluids, oil-based and synthetic-based fluids, emulsions, or mixtures thereof. Exemplary aqueous fluids include but are not limited to water and water-based gels. When the carrier fluid comprises water, the water can be fresh water, unsaturated salt solution, including brines and seawater, and saturated salt solution. The carrier fluid is present in an amount of from about 20% to about 200% by weight of the base mix for cementitious materials. In further embodiments, the carrier fluid is present in an amount of from about 100% to about 200%, from about 50% to about 150% or from about 100% to about 125% by weight of the base mix for cementitious materials. Exemplary oil-based carrier fluids include but are not limited to canola oil, kerosene, diesel oil, fish oil, mineral oil, sunflower oil, corn oil, soy oil, olive oil, cottonseed oil, peanut oil and paraffin. Exemplary synthetic-based fluids include but are not limited to esters, olefins or ethers, e.g., esters having a $C_2$-$C_{12}$ alcohol portion and a $C_{16}$-$C_{24}$ carboxylic acid portion, olefins having a $C_6$-$C_{18}$ linear internal portion, or ethers having a $C_6$-$C_{24}$ portion. Those of ordinary skill in the art will understand that the carrier fluid for the compositions as provided herein depends upon the properties desired for the compositions, as well as the cost, availability, temperature, stability, viscosity, clarity, and the like of the carrier fluid, and further that when non-aqueous carrier fluids are used, the composition is expected to be exposed to an aqueous fluid in the well for the composition to set. For example, such aqueous fluids may come from the cementitious slurry or from the permafrost or waterwell formation.

Setting Conditions: Setting of the cementitious compositions of the present embodiments may occur under a variety of conditions including variations in time and temperature. For applications using PVC pipe as casing, the setting temperature is below about 176° F. (80° C.). Setting temperatures of about 15° F. to about 175° F. (−9.4° C. to 79.4° C.) are appropriate for setting of the present compositions. In further embodiments, a temperature ranging between any of and including any of 15° F. (−9.4° C.), 30° F. (−1.1° C.), 50° F. (10.0° F.), 70° F. (21.1° C.), 90° F. (32.2° C.), 110° F. (43.3° C.), 130° F. (54.4° C.), 140° F. (60.0° C.), 150° F. (65.6° C.), 160° F. (71.1° C.), 170° F. (76.7° C.), or 175° F. (79.4° C.) is appropriate for setting of the present compositions. A target setting time for embodiments of the present invention is adjusted for the time needed to pump the cement into place. A target setting time for a cementitious composition of the present invention is adjusted such that the composition remains fluid for about 2 to about 6 hours to allow placing behind casing materials, and then sets within an acceptable time period such as a day.

The compositions may comprise a slurry density of about 10 pounds per gallon (1200 kilograms per cubic meter) to about 16 pounds per gallon (1920 kilograms per cubic meter). In further embodiments, the compositions may comprise a slurry density ranging between any of and including any of about 11 ppg (1320 $Kg/m^3$), 11.5 ppg (1380 $Kg/m^3$), 12.0 ppg (1440 $Kg/m^3$) 12.5 ppg (1500 $Kg/m^3$), 13.0 ppg (1560 $Kg/m^3$), 13.5 ppg (1584 $Kg/m^3$), 14.0 ppg (1680 $Kg/m^3$), 14.5 ppg (1740 $Kg/m^3$), 15.0 ppg (1800 Kg/m3), 15.5 ppg (1860 Kg/m3), and 16.0 ppg (1920 Kg/m3).

In a further embodiment of the present invention, the method of performing a cementing operation in a permafrost zone or a waterwell zone, the zone penetrated by a wellbore, comprises placing a cementitious composition into the zone, the cementitious composition comprising a base mix of cement and zeolite, and a water-based carrier fluid; and allowing the cementitious composition to set therein. In another embodiment of the method, the cementitious composition comprises a base mix of fly ash and zeolite, and a water-based carrier fluid.

The following example is illustrative of the method of lowering the maximum temperature of setting of a cementitious composition while increasing compressive strength. Slurries in the following examples were prepared, and compressive strengths were measured, according to API recommended practice for testing well cements as described in API Recommended Practice 10B, 22nd edition, December 1997.

EXAMPLE

According to the present example slurry samples were prepared using standard API mixing procedure (API Recommended Practice 10B, 22nd edition, December 1997) and include the components set forth in Table 1. Zeolite (chabazite) was obtained from the C2C Corporation (Calgary, Canada) and mined from Arizona; Class C Fly Ash was obtained from Halliburton Energy Services, Duncan, Okla.;

Premium Plus cement (API Class C cement) was obtained from Lehigh Inland Cement Limited (Edmonton, Alberta, Canada); and Class C fly ash retarder (sodium citrate) was obtained from Fritz Industries Inc. (Mesquite, Tex.).

The density of compositions 1-4 was 15.1 ppg (1812 Kg/m$^3$), 14.7 ppg (1764 Kg/m$^3$), 14.3 ppg (1716 Kg/m$^3$) and 15.0 ppg (1800 Kg/m$^3$), respectively. The water-to-solids ratio was 0.4 (40% water) for compositions 1 and 2 and 0.5 (50% water) for compositions 3 and 4.

TABLE 1

Components of Cementitious Compositions

| Composition No. | Cement, g, weight % of base mix | Class C Fly Ash, g, weight % of base mix | Zeolite, g, weight % of base mix | Retarder, g, weight % of base mix | Water, g |
|---|---|---|---|---|---|
| 1 (Cement control) | 1111.5 g 100% | — | — | — | 601.5 g |
| 2 (Cement and Zeolite) | 773.6 g 70% | — | 331.6 g 30% | — | 568.2 g |
| 3 (Fly Ash control) | — | 769.2 g 100% | — | 3.8 g 0.5% | 307.7 g |
| 4 (Fly Ash and Zeolite) | — | 968.3 g 87% | 140.9 g 13% | 5.5 g 0.5% | 517.2 g |

Figure 2:
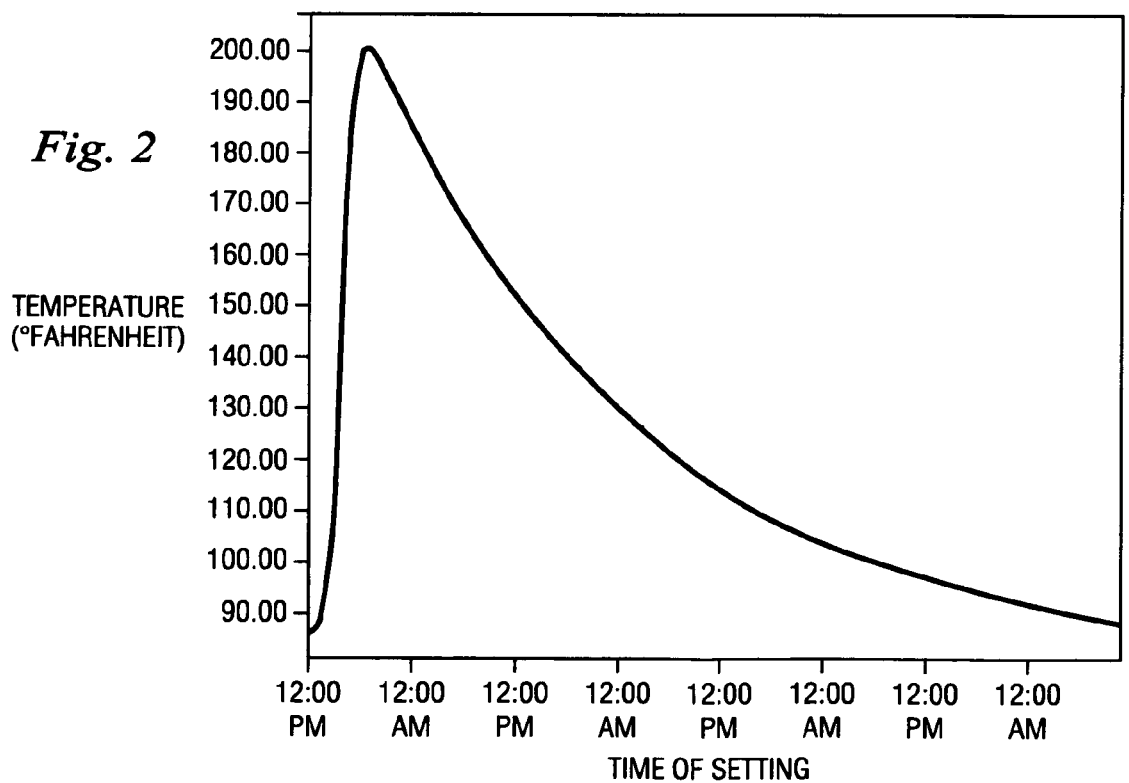
FIG. 2 is a plot of temperature vs. time of setting for cement and zeolite composition 2.
Figure 3:
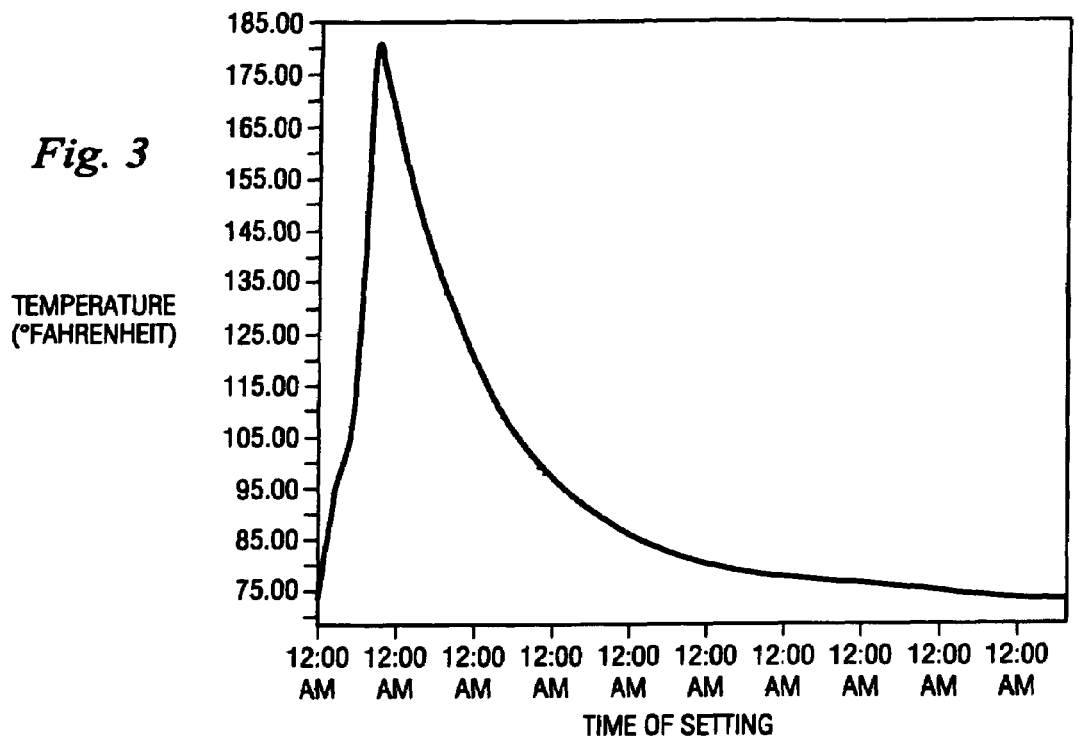
FIG. 3 is a plot of temperature vs. time of setting for fly ash composition 3.
Figure 4:
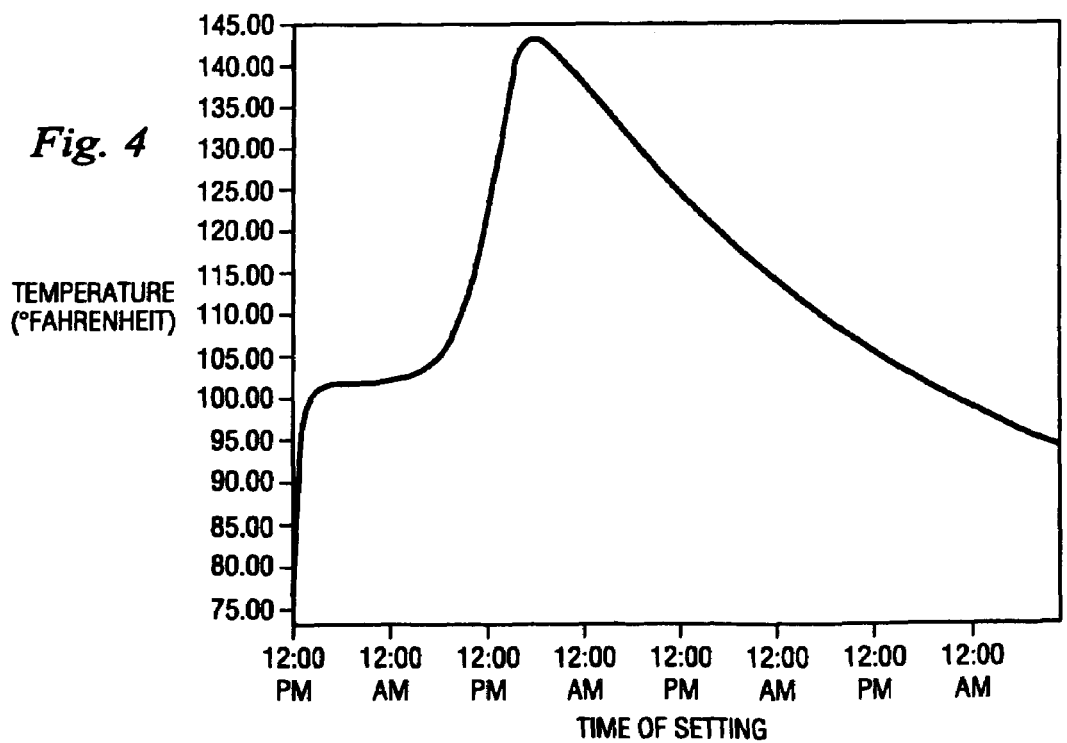
FIG. 4 is a plot of temperature vs. time of setting for fly ash and zeolite composition 4.

A sufficient amount of each slurry of compositions 1-4 was prepared to fill a glass vacuum flask to the one liter mark and a temperature recording thermocouple device (SAPAC Temprecord III, precision temperature recorder (Monitor Company, Modesto, Calif.)) was placed into the slurry. The top of the flask was sealed to ensure that no heat was lost. The flask was then placed in a 5 gallon bucket surrounded by polystyrene to maintain a constant external atmosphere. The temperature recorders provided the temperature of the slurry as it hydrated. Temperature data are provided for 4 days for compositions 1, 2 and 4 in FIGS. 1, 2, and 4 respectively. Temperature data are provided for 9 days for composition 3 in FIG. 3. The beginning temperature, the maximum temperature reached during setting, and the difference between the two temperatures is provided in Table 2 for compositions 1-4. Compressive strengths were obtained using an Ultrasonic Cement Analyzer (Halliburton Energy Services, Duncan, Okla.) at three days of setting time and are provided in Table 2.

TABLE 2

Compressive Strengths and Temperature Rise During Setting

| Composition No. | 72 hr (3 day) compressive strength psi (MPa) | Beginning Temperature ($T_0$) °F. (°C.) | Maximum Temperature ($T_{max}$) °F. (°C.) | $T_{max} - T_0$ °F. (°C.) |
|---|---|---|---|---|
| 1 (Cement control) | 2350 (16.2) | 83.2 (28.4) | 222.37 (105.76) | 139.17 (77.36) |
| 2 (Cement and Zeolite) | 3650 (25.2) | 86.25 (30.14) | 200.43 (93.57) | 114.18 (63.43) |
| 3 (Fly Ash control) | 21.6 (0.15) | 73.49 (23.05) | 181.47 (83.04) | 107.98 (59.99) |
| 4 (Fly Ash and Zeolite) | 792 (5.46) | 76.6 (24.78) | 143.2 (61.78) | 66.6 (37) |

As shown by the data of Table 2, the presence of zeolite in the base mix provides for a decrease in the temperature change from the beginning of the setting reaction to the maximum temperature achieved during setting. Further, the compositions having zeolite present have increased compressive strength at three days as compared to compositions lacking zeolite. Thus, the results of the present example demonstrate that the presence of zeolite in a cementitious slurry provides a lower maximum temperature for the setting reaction while simultaneously providing greater compressive strength to the set composition as compared to a slurry not having zeolite present.

Other embodiments of the present invention will be apparent to those skilled in the art from a consideration of this specification or practice of the embodiments disclosed herein. However, the foregoing specification is considered merely exemplary of the present invention with the true scope and spirit of the invention being indicated by the following claims.

The references cited herein, to the extent that they provide exemplary procedural or other details supplementary to those set forth herein, are specifically incorporated by reference.

As used herein and unless otherwise indicated, the terms "a" and "an" are taken to mean "one", "at least one" or "one or more".

What is claimed is:

1. A method of performing a cementing operation, comprising:
   placing a cementitious composition in a permafrost zone or a waterwell zone, the cementitious composition comprising:
   a base mix of cementitious material and zeolite, and
   a carrier fluid; and
   allowing the cementitious composition to set therein,
   wherein the maximum temperature reached during the setting of the cementitious composition is at least 25° F. less than the maximum temperature that would be reached during setting of the cementitious composition without zeolite.

2. The method of claim 1 wherein the cementing operation is primary cementing.

3. The method of claim 1 wherein the cementing operation is remedial cementing.

4. The method of claim 1 wherein the zeolite is present in the base mix in an amount of from about 5% to about 95% by weight of the base mix.

5. The method of claim 1 wherein the zeolite is present in the base mix in an amount of from about 5% to about 50% by weight of the base mix.

6. The method of claim 1 wherein the zeolite is present in the base mix in an amount of from about 20% to about 40% by weight of the base mix.

7. The method of claim 1 wherein the cementitious material is selected from the group consisting of cement, fly ash, slag, diatomaceous earth, fumed silica, calcined shale, metakaolin, rice husk ash, or a combination thereof.

8. The method of claim 7 wherein the cementitious material comprises cement.

9. The method of claim 7 wherein the cementitious material comprises Class C fly ash.

10. The method of claim 7 wherein the cementitious material comprises a combination of cement and fly ash.

11. The method of claim 1 wherein the zeolite is represented by the formula:

$$M_{a/n}[(AlO_2)_a(SiO_2)_b] \cdot xH_2O$$

where M represents one or more cations selected from the group consisting of Na, K, Mg, Ca, Sr, Li, Ba, $NH_4$, $CH_3NH_3$, $(CH_3)_3NH$, $(CH_3)_4N$, Ga, Ge and P;

n represents the cation valence;

the ratio of b:a is in a range from greater than or equal to 1 and less than or equal to 5; and x represents the moles of water entrained into the zeolite framework.

12. The method of claim 1 wherein the zeolite is selected from the group consisting of analcime, bikitaite, brewsterite, chabazite, clinoptilolite, faujasite, harmotome, heulandite, laumontite, mesolite, natrolite, paulingite, phillipsite, scolecite, stellerite, stilbite, and thomsonite.

13. The method of claim 1 wherein the cementitious material comprises fly ash and the composition further includes a retarder.

14. The method of claim 1 wherein the carrier fluid comprises a water-based carrier fluid.

15. The method of claim 1 wherein the carrier fluid comprises an oil-based carrier fluid.

16. The method of claim 1 wherein the cementitious composition further comprises an additive, wherein the additive is selected from the group consisting of an accelerator, a retarder, an activator, a defoamer or a combination thereof.

17. The method of claim 16 wherein the additive is a retarder and the retarder is a lignosulfonate.

18. The method of claim 1 further comprising foaming the cementitious composition to form a foamed cementitious composition.

19. A method of performing a cementing operation, comprising:

placing a cementitious composition in a permafrost zone or a waterwell zone, the cementitious composition comprising:

a base mix of cement and zeolite, and a carrier fluid; and allowing the cementitious composition to set therein, wherein the maximum temperature reached during the setting of the cementitious composition is at least 25° F. less than the maximum temperature that would be reached during setting of the cementitious composition without zeolite.

20. A method of performing a cementing operation, comprising:

placing a cementitious composition in a permafrost zone or a waterwell zone, the cementitious composition comprising:

a base mix of fly ash and zeolite, and a water-based carrier fluid; and allowing the cementitious composition to set therein, wherein the maximum temperature reached during the setting of the cementitious composition is at least 25° F. less than the maximum temperature that would be reached during setting of the cementitious composition without zeolite.

* * * * *